United States Patent
Shaffer et al.

(10) Patent No.: US 7,167,907 B2
(45) Date of Patent: *Jan. 23, 2007

(54) SYSTEM FOR LINKING INFORMATION IN A GLOBAL COMPUTER NETWORK

(76) Inventors: James D. Shaffer, P.O. Box 9543, Rancho Santa Fe, CA (US) 92067; George G. Moore, 9411 Cornwall Farms Rd., Great Falls, VA (US) 22066-2701

( * ) Notice: Subject to any disclaimer, the term of this patent is extended or adjusted under 35 U.S.C. 154(b) by 68 days.

This patent is subject to a terminal disclaimer.

(21) Appl. No.: 10/828,638

(22) Filed: Apr. 21, 2004

(65) Prior Publication Data

US 2004/0199506 A1 Oct. 7, 2004

Related U.S. Application Data

(63) Continuation of application No. 09/596,024, filed on Jun. 15, 2000, now Pat. No. 6,748,426.

(51) Int. Cl.
*G06F 15/16* (2006.01)
*G06F 7/00* (2006.01)

(52) U.S. Cl. ............... 709/219; 707/10; 707/104.1

(58) Field of Classification Search ........ 709/217–219; 707/1–10, 104.1, 104; 379/207.02
See application file for complete search history.

(56) References Cited

U.S. PATENT DOCUMENTS

| | | | | |
|---|---|---|---|---|
| 4,757,267 A | * | 7/1988 | Riskin | ............... 379/114.24 |
| 5,054,082 A | | 10/1991 | Smith et al. | |
| 5,095,505 A | * | 3/1992 | Finucane et al. | ...... 379/201.02 |
| 5,499,288 A | | 3/1996 | Hunt et al. | |
| 5,533,107 A | * | 7/1996 | Irwin et al. | ............. 379/201.01 |
| RE36,111 E | * | 2/1999 | Neville | .................. 379/127.01 |
| 5,897,616 A | | 4/1999 | Kanevsky et al. | |
| 5,901,214 A | * | 5/1999 | Shaffer et al. | ......... 379/211.02 |
| 5,940,793 A | | 8/1999 | Attwater et al. | |
| 5,948,061 A | * | 9/1999 | Merriman et al. | .......... 709/219 |
| 6,016,509 A | | 1/2000 | Dedrick | |
| 6,021,406 A | * | 2/2000 | Kuznetsov | ..................... 707/6 |
| 6,097,802 A | | 8/2000 | Fleischer, III et al. | |
| 6,108,533 A | | 8/2000 | Brohoff | |
| 6,108,650 A | | 8/2000 | Musk et al. | |

(Continued)

OTHER PUBLICATIONS

"Domino's delivers using new call routing service"; *Network World*, vol. 8, No. 32, dated Aug. 12, 1991, pp. 1 and 55.

(Continued)

*Primary Examiner*—David Wiley
*Assistant Examiner*—Joseph E. Avellino
(74) *Attorney, Agent, or Firm*—Procopio, Cory, Hargreave & Savitch

(57) ABSTRACT

A system that flexibly, retrieves, processes and distributes data across a global computer network is disclosed. Within the system, a first party identifier is captured and converted into a Linkage Key, such as a United States Postal Service Delivery point code (11-digit zip code). The Linkage Key is then used to retrieve Linkage Key indexed data from various network nodes that house components of a virtual Linkage Key indexed database. The retrieved information associated with the first party identifier is then distributed by the system to one or more network nodes to provide benefits to the first party and other network nodes.

20 Claims, 8 Drawing Sheets

U.S. PATENT DOCUMENTS

| | | | |
|---|---|---|---|
| 6,236,967 | B1 | 5/2001 | Brotman et al. |
| 6,460,079 | B1 | 10/2002 | Blumenau |
| 6,473,740 | B1 * | 10/2002 | Cockrill et al. ............... 705/27 |
| 6,510,414 | B1 | 1/2003 | Chaves |
| 6,978,248 | B1 * | 12/2005 | Walker et al. ................ 705/10 |
| 7,082,532 | B1 * | 7/2006 | Vick et al. .................. 713/155 |
| 2001/0020242 | A1 | 9/2001 | Gupta et al. |

OTHER PUBLICATIONS

"Weight Watchers reduces customers' wait for service"; *PBX/Key/Centrex*, dated Jul. 1995, p. 11.

Courtney, "e*Index Global Identifier—From SeeBeyond," *eAI Journal*, p. 58, Feb. 2001.

Levin, Stewart A., "Ner Tamid Mailing List Guide" Jun. 7, 1997.

Ozsu et al., "Principles of Distributed Database Systems," Prentice Hall, 1991, pp. 380-386.

* cited by examiner

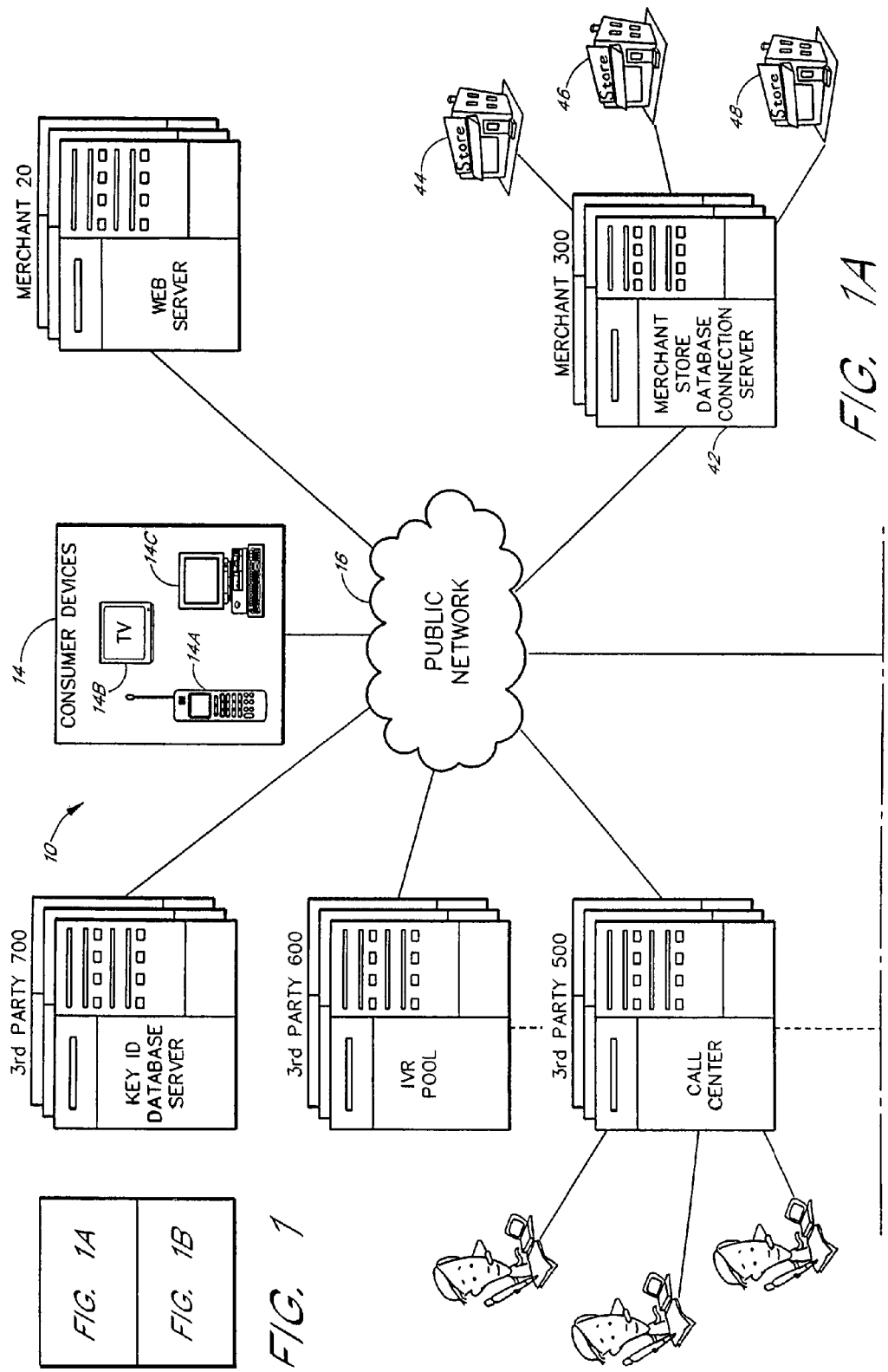

SYSTEM FOR LINKING INFORMATION IN A GLOBAL COMPUTER NETWORK

RELATED APPLICATION

This application is a continuation of U.S. application Ser. No. 09/596,024, filed Jun. 15, 2000 now U.S. Pat. No. 6,748,426.

BACKGROUND OF THE INVENTION

1. Field of the Invention

The present invention relates to methods and systems for linking information between different parties/nodes in a global computer network. More specifically, this invention relates to methods and systems for storing, retrieving and linking consumer information across the Internet.

2. Description of the Related Art

Several companies are utilizing the power of the Internet to amass and provide information on consumers to various companies. For example, U.S. Pat. No. 5,948,061 to Merriman discloses a system for displaying custom advertising on Internet pages. The disclosed system utilizes a redirect or hidden connection feature built into the Internet Protocol (IP) network Hypertext Transport protocol (HTTP). In Merriman, a merchant site redirects a consumer browser to an advertising server by placing an advertisement that is stored on the advertising server onto the merchant page. Once the consumer browser accesses the merchant page, the browser is redirected or establishes a hidden temporary connection to the advertising server so that the advertisement can be retrieved. Once the browser is connected to the advertising server, the advertising server reads any of its Internet cookies that have been previously stored on the consumer's computer. If a cookie is found, the advertising server then performs one or more of the following tasks:

Looks up a Consumer Identification String stored in the cookie with the advertising server's merchant site consumer history database, Determines the consumer's web browsing preferences, Determines which of the ad banners that the advertising server is licensed to place will most likely appeal to the current consumer, Updates the consumer's cookies with any new information Redirects or connects the consumer browser back to the merchant server, Provides the merchant address with the Internet address of the advertising banner determined to be preferred by the consumer, Updates the advertising server with new information on the consumer history database, Updates the advertising banner read or placed database to indicate that the advertisement was displayed on the merchant's Internet page.

Unfortunately, the type of information that is made available to the merchant server is very limited. For example, in these systems, the only information available is that which has been stored in the merchant's consumer file and the cross-session advertising consumer preference information obtained from third party advertising servers.

For this reason, there is an existing need for merchants and advertisers to be provided with systems and methods that provide information outside this limited universe. This need will become more prevalent as the Internet becomes more widely used in the home and for businesses.

SUMMARY OF THE INVENTION

In one embodiment of the invention there is a computerized information system for retrieving consumer data over a network, comprising a first information server for receiving a consumer identifier from a consumer network interface device; a Linkage Key conversion module comprising instructions for converting the consumer identifier into a Linkage Key; a Linkage Key database comprising consumer data indexed by the Linkage Key; and instructions for comparing the Linkage Key to the linkage database in order to retrieve consumer data from the linkage database.

DETAILED DESCRIPTION OF THE PREFERRED EMBODIMENT

I. Definitions

A. Data String

Figure 1B:
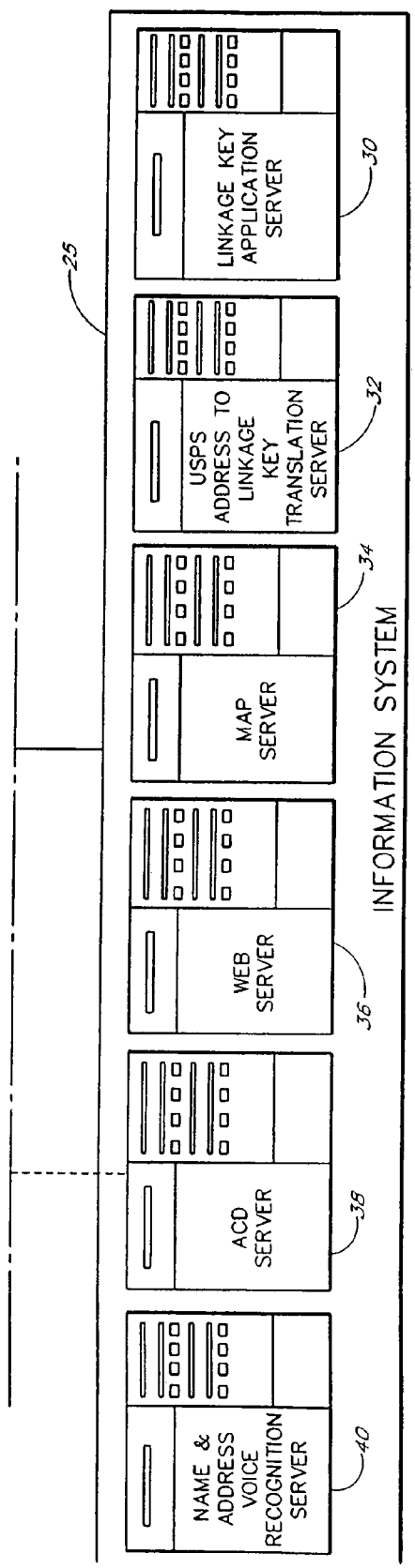
FIG. 1 is a block diagram illustrating one embodiment of a system for linking data between a consumer and a merchant.

A data string can include any number of numerical symbols, alphanumeric characters, and punctuation symbols. Data strings are normally, but not necessarily, stored to a memory, such as Random Access Memory (RAM) or a hard disk drive.

B. Input Devices

The input device can be, for example, a keyboard, rollerball, mouse, voice recognition system, hand writing pad with hand writing recognition software or other device capable of transmitting information from a user to a computer. The input device can also be a touch screen associated with the display, in which case the user responds to prompts on the display by touching the screen. The user may enter textual information through the input device such as the keyboard or the touch-screen.

C. Instructions

Instructions refer to computer-implemented steps for processing information in the system. Instructions can be implemented in software, firmware or hardware and include any type of programmed step undertaken by components of the system.

D. LAN

One example of the Local Area Network may be a corporate computing network, including access to the Internet, to which computers and computing devices comprising the system are connected. In one embodiment, the LAN conforms to the Transmission Control Protocol/Internet Protocol (TCP/IP) industry standard. In alternative embodiments, the LAN may conform to other network standards, including, but not limited to, the International Standards Organization's Open Systems Interconnection, IBM's SNA, Novell's Netware, and Banyan VINES.

E. Microprocessor

The microprocessor may be any conventional general purpose single- or multi-chip microprocessor such as a Pentium® processor, a Pentium® Pro processor, Pentium II, Pentium III, AMD processor, a 8051 processor, a MIPS® processor, a Power PC® processor, SPARC, ULTRA SPARC or an ALPHA® processor. In addition, the microprocessor may be any conventional special purpose microprocessor such as a digital signal processor or a graphics processor. The microprocessor typically has conventional address lines, conventional data lines, and one or more conventional control lines.

F. Modules

The system is comprised of various modules as discussed in detail below. As can be appreciated by one of ordinary skill in the art, each of the modules comprises various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

G. Networks

The system may include any type of electronically connected group of computers including, for instance, the following networks: Internet, Intranet, Local Area Networks (LAN), telephone Signaling System 7 (SS7) or Wide Area Networks (WAN). In addition, the connectivity to the network may be, for example, remote modem, Wireless, Ethernet (IEEE 802.3), Token Ring (IEEE 802.5), Fiber Distributed Datalink Interface (FDDI) or Asynchronous Transfer Mode (ATM). Note that computing devices may be desktop, server, portable, hand-held, set-top, or any other desired type of configuration. As used herein, an Internet includes network variations such as public internet, a private internet, a secure internet, a private network, a public network, a value-added network, an intranet, and the like.

H. Operating Systems

The system may be used in connection with various operating systems such as: UNIX, Disk Operating System (DOS), OS/2, Solaris, Windows 3.X, Windows 95, Windows 98, Windows 2000 and Windows NT.

I. Programming Languages

The system may be written in any programming language such as C, C++, BASIC, Pascal, Java, and FORTRAN and ran under the well-known operating system. C, C++, BASIC, Pascal, Java, and FORTRAN are industry standard programming languages for which many commercial compilers can be used to create executable code.

J. Transmission Control Protocol

Transmission Control Protocol (TCP) is a transport layer protocol used to provide a reliable, connection-oriented, transport layer link among computer systems. The network layer provides services to the transport layer. Using a two-way handshaking scheme, TCP provides the mechanism for establishing, maintaining, and terminating logical connections among computer systems. TCP transport layer uses IP as its network layer protocol. Additionally, TCP provides protocol ports to distinguish multiple programs executing on a single device by including the destination and source port number with each message. TCP performs functions such as transmission of byte streams, data flow definitions, data acknowledgments, lost or corrupt data re-transmissions and multiplexing multiple connections through a single network connection. Finally, TCP is responsible for encapsulating information into a datagram structure.

K. Public Network

A public network is defined to be any network used for communication between two or more parties or nodes where a third party controls at least one component of the network. Currently the three most common public networks are the SS7 (Signaling System 7) circuit switching telephone network, wireless analog or digit telephone network and the Internet that is a packet network that uses IP (Internet Protocol).

L. Linkage Key Input Parameter Values (LKIPV)

A LKIPV is a data item or items that is provided by the network, a network user or a user device connected to the network. The LKIPV is used to determine a Linkage Key that can be used to link to information associated with the user and stored on other network nodes. Examples of LKIPV's are: a 10-digit telephone number, an United States Postal Service address, an United States Postal Service address plus a consumer name, a 10-digit telephone number plus a consumer name and the latitude and longitude of a current consumer location. Moreover, in regard to communication across the Internet, an IP address or e-mail address can also be used as a LKIPV.

M. Linkage Key (LK)

A Linkage Key (LK) is a data value used to associate in real-time information located in multiple databases or network nodes. Conceptually it is analogous to a catalyst in a chemical reaction, it provides the means for two or more chemicals to react that would not otherwise react or would react at an unacceptably slow rate. One preferred Linkage Key for many applications is the USPS Delivery Point Code (DPC). This is 12-digit code composed of an 11-digit zip code with a 1-digit check digit. The DPC is a geographical hierarchical code that at the 11-digit zip code level represents as single household or postal delivery address. The DPC, like other embodiments of a Linkage Key, is determined from an LKIPV or equivalent data items stored in a database or file via a determination process. The most common determination processes are: (1) a translation table (phone number to DPC), (2) a simple computer data manipulation (interleaving a latitude and longitude coordinate pair to create an interleaved latitude and longitude hierarchical key known as a quad-tree), (3) a simple computer process used in conjunction with a translation table (appending a 5-digit zip code, the first 5 characters of a street name, the first 5 digits of the street number, the first 5 characters of a last name and the first initial of a first name to create a match key and then looking the match key up in a sequential number database to retrieve, or assign if not found, a unique sequential number that is the Linkage Key, and (4) a complex multi stage computer process that uses multiple databases (standardizing an address containing a building number, pre-direction, street name, street type, street post direction, secondary unit type, secondary unit number, city name and state and then assigning the standardized address a DPC code). A non-exclusive list of Linkage Keys are: DPC, ZIP+4, State-county/census tract/census block, coordinate interleaved pair (lat/lon) or quad-tree, 10-digit telephone number, standardized street address, standardized street address plus a standardized name, 10-digit telephone number plus standardized name, sequentially assigned number, and the like.

N. Linkage Mechanism

A Linkage mechanism is the means by which information from multiple sources are linked together. The most common are a simple Linkage Key match and a hierarchical component of a Linkage Key match used to reduce the universe of items to be compared and then a more complex set of programmed rules or algorithms are used for the final linkage determination. An example of the later case is finding the closest retail location to the current client location where the client is using a portable computer connected to the network and the computer has a Global Positioning Satellite (GPS) receiver. The client computer sends the client's current latitude and longitude that has been determined by the GPS receiver. The latitude and longitude coordinates are converted to a quad-tree Linkage Key. This Linkage Key is matched to the quad-tree Linkage Key assigned to each of the store locations. At a specified hierarchical level of quad-tree match, let us assume for this example that there are four possible candidate stores that could be the closest to the client. A distance calculation is performed using the current client latitude and longitude and the latitude and longitude of each of the four candidate stores to determine the distance from the current client location to each of the four stores. The store with the short distance is determined to be the closest store and the information related to this store is passed back to the client.

O. Linkage Process

The Linkage process is normally composed of four steps: (1) obtaining a LKIPV, (2) determining a Linkage Key associated with the LKIPV, (3) using the Linkage Key in conjunction with a linkage mechanism to retrieve and/or determine in real-time information associated with the LKIPV by accessing Linkage Key indexed databases located locally or on other network nodes and (4) providing the linked-to information to one or more network nodes.

II. Overview

Embodiments of this invention relate to systems and methods for flexibly storing, retrieving and linking information across a global computer network. In this embodiment, consumer computers provide Linkage Key Input Parameter Values (LKIPVs) such as telephone numbers, addresses, latitude/longitude values, IP addresses, email addresses or other similar information to an information system communicating across the Internet. The information system is programmed to return pre-selected data back to the consumer computer, or another computer, in response to the consumer computer's request. In this embodiment, the LKIPV is first converted to a Linkage Key that is then used to access one of a plurality of indexed databases. In some embodiments, the Linkage Key acts as a type of spatial key that defines a geographic area related to the consumer. A discussion of spatial keys can be found in U.S. Pat. No. 6,058,179, Issued May 2, 2000 under the title "One number, intelligent call processing system", which is hereby incorporated by reference.

For example, a LKIPV might be a telephone number that is translated into a Linkage Key such as a zip code that represents a geographic region near the business or home that has the designated telephone number. The zip code Linkage Key can then be used to access a database of services indexed by zip code in order to provide the consumer with information on services within the particular geographic area. Because the LKIPV to Linkage Key translation is done at the time of the consumer's request, the most up-to-date information on services within the designated geographic area like local traffic or weather can be provided.

In one embodiment, an Internet server that provides goods and services to consumers, hereinafter a "merchant server" gathers pre-selected consumer data as a consumer browses pages on the merchant server's Internet web site in order to more specifically serve the needs of the consumer. In one embodiment of the system, the merchant server gathers some information from the consumer through a request form that is displayed within the consumer's browser software. Examples of browser software include Netscape Navigator and Microsoft Internet Explorer. The form sent to the consumer is preferably a conventional Hypertext Markup Language (HTML) form that transmits text data from the consumer's browser directly into a database located on the merchant server. One type of form, for example, might be a registration form that a consumer fills out in order to be provided with a username and password for accessing various secure areas of the merchant server's Internet site.

After the text data from the form has been transmitted to the merchant server, the merchant server temporarily redirects the consumer's browser software to an information system which saves an identification string to the consumer's computer by one of several methods discussed below.

Within the information system is an Internet web server that writes a unique identification string, such as a LKIPV or Linkage Key, to a cookie data file on the consumer computer. In one embodiment, the cookie data file contains a unique consumer identifier string, a date the cookie was stored, a date the cookie was last updated, and an LKIPV, preferably, the consumer telephone number. In another embodiment, the stored identifier is a Linkage Key in the form of an encoded DPC that represents the consumer's address that can be later converted into a full U.S. Postal address of the consumer.

Now that an identifier (e.g. telephone number or encoded address) has been written to the consumer computer by the Information Web Server, the merchant server can be provided with various types of data by matching the identifier with various databases of information. For example, as will be discussed in detail below, the merchant can be provided with median income data, property value data, census data, business and government location data and other data related to the spatial location of the consumer.

The merchant may request the information system to provide median income level data for all consumers that are passed to the web server. Once a consumer computer has a stored cookie data file, the same merchant server can, at any time, temporarily redirect the consumer computer to the Internet web server in the information system. The consumer information is passed from the merchant to the Internet web server. The web server then uses the stored identifier as an LKIPV which it converts in real-time to a Linkage Key or a predetermined and stored Linkage Key to access, for example, a database of median income levels indexed by geographical location. By searching the database using the stored identifier from the cookie data file, the median income level can be determined for the geographic location of the consumer.

One advantage of this system is realized when the consumer points their browser to a second merchant server. In one embodiment, the opening page of the second merchant server preferably redirects the consumer computer to the Internet web server within the information system. The Internet web server then reads the cookie data file stored on the consumer computer in order to discern the identifier for the consumer that was previously stored. Once the identifier has been read, the consumer's browser is redirected back to the second merchant's opening page. The Internet web server uses the retrieved identifier to access any of a plurality of data sources in order to discover information on the consumer. This information could be, for example, the identity of the consumer, the geographical location of the consumer, the median income of the neighborhood where the consumer resides, etc.

The retrieved information is then forwarded to the second merchant server in order to provide the second merchant server with additional details on the consumer that is browsing their site. It should be noted that the consumer did not enter any new information on the second merchant' site. Because the cookie data file was found on the consumer's computer, the second merchant was able to successfully determine information on the consumer by passing control temporarily to the web server. This mechanism thereby allows merchants to customize each consumer's browsing experience so that the consumer is provided with a selection of products or services that are most likely to appeal to the consumer.

One other embodiment of the invention is a system for providing information directly to consumers based on an identifier transmitted from the consumer to the information system. For example, a consumer connected to the Internet may be in the middle of typing a letter to a friend in a word processing program. However, the consumer might only know the telephone number, but not address of the friend. One embodiment is a software application that runs as an applet within a word processing program, such as Microsoft Word, for determining a street address associated with a LKIPV, such as a telephone number. The consumer enters the telephone number of his friend then selects a "lookup" option within the software program. The applet transmits the telephone number across the Internet to the IP address and port number of the information system wherein it is used as a LKIPV and compared against an indexed database of telephone numbers and address Linkage Keys. In this embodiment, the address Linkage Key is the USPS DPC corresponding to the address. If the telephone number is found in the database, the corresponding address Linkage Key is then used to build the address from databases of USPS ZIP+4 and city/state files. The constructed address is then returned to the consumer computer and inserted into the word processing document. In this application the Internet is being used as a wide area network, without using HTTP protocols or accesses to an Internet server.

In another embodiment, the invention includes a system and method for determining high potential demand merchandise that is to be displayed to a consumer that is browsing a web site. For example, the consumer uses browser software, such as Internet Explorer (Microsoft Corporation) or Netscape Navigator (Netscape Corporation) to attach to a merchant web site server that sells sporting goods. After the consumer has attached to the server, the consumer's browser is immediately redirected to a web server in the information system. The web server reads a cookie data file that has been previously stored on the consumer computer, and retrieves an identifier that has been stored in a cookie data file. The browser is then redirected back to the merchant server. In parallel with the above process, the information system uses the retrieved identifier as a LKIPV. For example, the cookie data file might include a telephone number of the consumer. This telephone number is used as a LKIPV to determine a zip code Linkage Key representing the geographic area where the consumer lives or works. The zip code Linkage Key is then used make an independent IP request to a Linkage Key server for a Claritas' Micro Vision geo-demographic segment number that corresponds to the consumer's Linkage Key. The Linkage Key server then calculates the sporting goods profile scores for various types of sporting good merchandise for the retrieved Micro Vision segment and determines that consumers with the retrieved MicroVison segment have the highest propensity to buy football, baseball and basketball merchandise. The Linkage Key server then transmits this information to the merchant server. The merchant server, using the retrieved information on the browsing consumer, then displays a custom web page for the consumer that shows specials and related details for these three sports.

In another embodiment, a consumer is in his car and decides to order pizza for dinner. The consumer's car is equipped with a mobile computer that is linked to a GPS receiver. The consumer attaches to Pizza Chain A's web site in order to find the nearest Pizza Chain A dine-in restaurant. The consumer's browser passes the consumer's current latitude and longitude (lat/lon) to the web site based on the signals being received and processed by the GPS receiver. The Pizza Chain A web server receives the lat/lon coordinates from the consumer browser, and uses them as an LKIPV which is converted to a Linkage Key to access a map server within the information system. The Pizza Chain A web server transmits the lat/lon coordinates to the map server which generates a map image of the roads between the lat/lon coordinates of the car and the nearest Pizza Chain A dine-in location that is currently open. A system for providing lat/lon coordinates to a consumer is described in U.S. patent application Ser. No. 09/100,567, filed on Jun. 19, 1998 under the title "Automatic routing and information system for telephonic services" which is hereby incorporated by reference.

The map server also generates specific driving instructions for getting from the lat/lon coordinates of the car to the nearest open Pizza Chain A. These directions are then transmitted to the consumer's mobile computer. In order to provide such a service, the lat/lon numbers are not used as a Linkage Key directly. First, a lat/lon window having a fixed small area in size is created. This Window is used to limit the search of spatial databases. Within the Window the lat/lon is used for distance calculations to determine distance and other spatial relationships within the map server databases.

In another embodiment, multiple merchants enter into a consortium to provide advanced services to their consumers. The merchants pick a central web server to be their service bureau. When a consumer decides to purchase a product from a member of the consortium, the consumer provides consumer specific information such as name, mailing address and phone number information to the merchant server. After capturing the consumer specific information, the merchant server redirects the consumer's browser session to the central web server, and passes some of the consumer specific information to the central web server. The central web server notifies the consumer that it is going to write a cookie to the consumer computer and either writes the raw LKIPVs or determines a corresponding a Linkage Key and writes the Linkage Key to the consumer computer in the form of a cookie. The browser session is then redirected back to the merchant server where the ordering process is completed. Now, if the consumer browses a second merchant server that is part of the consortium, the second merchant server can redirect the consumer's browser to the central web server in order to retrieve the cookie data that was previously written by the central web server. By using this cookie data, the second merchant server can request various types of information on the consumer by reading the LKIPV, converting it to a Linkage Key or directly reading the Linkage Key in the stored cookie data file, and providing the Linkage Key to a linkage server to determine the median price of homes in the consumer's geographic area, the median income level of families in the consumer's geographic area and many other types of linkage information. This information is then sent to the second merchant server so that the information can be used to provide the consumer with a better experience browsing the second merchant's web site. The better experience might include custom pages, special pricing offers, special terms or other custom sites developed for the determined type of consumer.

In another embodiment two consumers use the system to make telephone calls to one another. For example, consumer A subscribes to voice over IP caller Name ID with a web server. Consumer B makes an IP call to Consumer A though a browser application. Upon receiving Consumer B's session connection request, Consumer A redirects the browser session to the web server. The web server then reads the consumer B cookie which provides a Linkage Key that relates to consumer B. The web server performs an independent IP network query to a database of names indexed by Linkage Key. The web server then returns consumer B's name from the database query to consumer A. Consumer A sees the name and decides to accept or reject the session with consumer B.

III. System Description

Referring now to FIG. 1, a system 10 for linking consumer information together is provided. The system 10 includes a plurality of consumer devices 14. Examples of consumer devices include wireless telephones 14A, broadcast systems 14B and personal computers 14C. Each consumer device 14 is the primary network interface device for an individual using the network to communicate with another individual or network service node. The consumer device 14 provides LKIPVs by standard network passing mechanisms. These LKIPVs can be provided by network ANI, DNIS and lat/lon passing. They can also be provided by consumer multi-media input during a session, retrieved from a consumer Open Profiling Standard database (OPS is a proposed standard that enables personalization of internet services, while protecting user privacy), retrieved from URL specific cookie stored on a consumer's computer, retrieved from a database, read from a memory address or provided by any other type of consumer hardware accessible to the current session server.

One type of hardware is a GPS receiver that can determine a consumer's current latitude and longitude and is incorporated into consumer hardware. LKIPVs can also be provided by network consumer devices such as a telephone, FAX, mobile telephone, Television with two-way communication, PDA (Personal Digital Assistant), personal computer or portable computer. The consumer device 14 can directly communicate with any other network device as well as other consumer devices. In addition, the consumer device 14 sends or receives any accessible information permitted by communicating parties. As illustrated, the consumer device 14 is connected to a public network 16. One example of such a network is the Internet, wherein the consumer device communicates via the Internet Protocol (IP) standard.

Also connected to the public network 16 is a merchant server 20. The merchant server 20 communicates with the consumer device 14, and accepts LKIPVs that the consumer device 14 provides by standard network passing mechanisms. For example, in one embodiment, the consumer device separates the LKIPVs into a plurality of IP packets which are sent across the Internet and reassembled at the merchant server.

The merchant server 20 redirects the consumer device 14 session, or passes temporary control via other means, to an information system 25 which is also connected to the public network 16. It should be noted that there are several mechanisms available for redirecting control of a consumer's browser to a different site on the Internet. Examples of methods for redirecting a consumer's browser to the information system 25 are explained in detail in FIGS. 2 and 3. Also shown in FIG. 1 is a second merchant server 42 that is linked to a set of stores 44–48.

It is common for merchants with multiple retail service locations to have a single URL or other single point of contact for all service or store locations. The merchant also has the need to determine which unit would best service the client based on distance, types of service offered by each unit and a unit's open/closed status, etc. The system described herein has the ability, based on the LKIPV, to determine which merchant retail unit best services the client location and return to the merchant a service unit id and related unit information such as distance, direction and/or driving directions, etc. Based on knowing the determined best servicing store the merchant can access that store's server or web site and can thereafter provide the client with menus, inventory status, service/delivery times and other valuable information items that vary by store and is only available in real-time at the individual store level.

As illustrated, the information system 25 includes a Linkage Key application server 30, a United States Postal Service address translation server 32, a map server 34, a web server 36, an ACD server 38 and a voice recognition server 40.

A. The Linkage Key Application Server

The Linkage Key application server (LKAS) 30 is a central component of the information system 25 shown in FIG. 1. The LKAS acts as an application, communication and information request integrator. For example, the LKAS 30 receives LKIPVs or Linkage Keys and matches these values with local and external databases to retrieve information relating to the LKIPV. These information requests normally come from merchant servers that have redirected consumer devices to the LKAS 30.

As shown, the LKAS communicates with several other servers that make up the information system 25. Of course, the other servers could be located in physically close or distant proximity to one another. In one embodiment, the LKAS and other servers are in separate geographic areas and are connected to one another through the public network 16. By communicating with the other servers, the LKAS can match the Linkage Key retrieved or generated from the consumer device cookie with other data stored within the information system 25.

B. The USPS Address Translation Server

The USPS address translation server 32 accepts street or mailing address information that has been redirected to the information system 25. From the address information, the server 32 returns a status code, a USPS standardized address and a USPS DPC Linkage Key, or alternatively, a hierarchical component of the Linkage Key. The USPS DPC Linkage Key can be generated from an address using commercially available software, such as Mailer's Software (San Clemente, Calif.) and others.

C. The Map Server

The map server 34 runs software, such as MapQuest NT Server® from MapQuest.com, that accepts formatted requests for maps and travel directions. These requests normally require input parameter values in the form of an address, the latitude and longitude of a geographic point, a map window bounded by a pair of latitude and longitude extremes, or a request for the layers to be mapped which can include store delivery polygons. The map server receives this data and renders a map in the form of an image, such as a Graphics Interchange Format (GIF) file that can be displayed by the requesting consumer device. The map server 34 also accepts two geographic points and can generate driving directions between the two points and thereafter provide the instructions in multiple formats to the requesting consumer device.

D. The Web Server

The web server 36 communicates with the consumer device 14 in order to accept LKIPVs provided by the consumer. The web server 36 includes instructions for writing a Universal Resource Locator (URL) persistent cookie data file, containing an LKIPV and/or a Linkage Key, to the consumer device 14.

By reading a LKIPV from the cookie data file stored on the consumer device 14, the web server 36 can, in real time, determine a Linkage Key that relates to the consumer. As is known, in their current implementation, cookie data files can only be read by the server that originally wrote them to the consumer device. Thus, any consumer device that has previously been redirected to the web server will have a cookie data file that can be read during a later session with the web server.

As discussed above, the web server 36 is accessed by a redirected consumer device 14. In order to write a cookie data file, following redirection, a LKIPV is generated from information transmitted from the consumer device. For example, if the consumer provides a USPS address, the web server 36 accesses the address translation server 32 which generates and returns to the web server a USPS DPC based on the address passed to it by the web server 36. The web server 36 then writes a URL persistent cookie containing the DPC Linkage Key to the consumer device 14.

It should be noted that the web server 36 can also directly communicate with other network nodes in order to send or receive any other information permitted by communicating parties. Moreover, the web server 36 can also redirect consumer devices 14 back to the merchant server 20 in order to pass back any consumer information gathered within the information system 25.

After the desired information is gathered from one or more databases in the information system 25 or from $3^{rd}$ Party Servers 700, the web server returns control of the consumer device to the requesting merchant server. The information that was retrieved by the information system is then passed to the requesting merchant server so that an analysis of the consumer using the consumer device can be prepared.

E. ACD Server 38

The ACD Server 38's primary function is to serve as a routing decision control point between multiple $3^{rd}$ Party IVR Pools 600 and $3^{rd}$ Party Call centers 500. The ACD Server 38 has the capability to monitor in real-time call capacity and call handling capabilities both within and between various $3^{rd}$ party locations. Based on the real-time information known to the ACD related to nodes 500 and 600 and information known about the caller provided by system 25, the ACD uses this information in conjunction with merchant call handling preferences to route the call to the either the call center 500 or IVR pool 600 that will best service a caller. The primary suppliers of ACD systems and software are Geotel and Genesys. The preferred supplier is Genesys which is located in San Francisco, Calif.

F. The Voice Recognition Server

The voice recognition server 40 translates spoken commands and instructions into ASCII text. For example, the voice recognition server 40 preferably runs voice recognition server software, such as that commercially available from Nuance Corporation (Menlo Park, Calif.). The voice recognition server takes voice utterance packets from an IVR running Nuance IVR client software. It compares these utterances to application specific grammars. These grammars are customized for each application. The three primary applications supported by server 40 are consumer telephone number, name and address recognition. The telephone number grammers are the digits 0–9 and are verified from the telecordia LERG files, address grammars are built from the USPS ZIP+4 and City-State files and the name grammars are built for the U.S. census bureau first and last name files that have been enhanced with additional names from the U.S. national white pages.

In this embodiment, the voice recognition server provides telephone number, name and address grammars that can, in real-time, be translated into phonetic vocal representations that can be compared to voice utterances received from an Interactive Voice Response (IVR) system 600, that can be running Nuance client software as shown in FIG. 1.

The results of the comparison between the spoken utterance and the phonetic vocal representations are then analyzed. This process is repeated until a correct recognition of the spoken word or word combination is known to be valid and is confirmed. Once the word combination is known, it can be used as a LKIPV or Linkage Key within the system as described previously.

Alternatively, if the spoken utterance is not understood by the system, the consumer device can be redirected to a help desk with a live operator, such as shown communicating with a call center (500).

In addition, LKIPV and Linkage Key data can be received from or sent to a third party Key ID database server 700 and provided to the system. Thus, given the appropriate access, either third party database providers can access the information system 25 in order to receive consumer data or system 25 can query for information stored in Linkage Key Indexed databases on $3^{rd}$ party servers 700.

The telephone numbers, addresses and names captured by this process are then used as LKIPVs to produce Linkage Keys. The validated telephone number can be translated to a Linkage Key or used as a Linkage Key in its raw form. In the future the SS7 network will have IP interfaces. As is known, the SS7 network provides access to large telephone company databases, such as the Line Information databases (LIDB) that are currently indexed by telephone number that would then be accessible for selected applications like phone number billing verification. On the other hand, LKIPVs such as the textual version of the address require a translation into a Linkage Key. The address text is passed to the USPS Address to Linkage Key translation server 32 and an address to DPC code translation is returned that serves as a household, or higher level, Linkage Key.

In one embodiment, the first name grammar database contains about 25,000 unique first names that are represented by a five digit number code. In addition, because there are approximately 400,000 unique last names, each One can be represented in a last name database by a six digit ASCII number code. The name codes can be append as last name and then first name to the end of either the address linkage code or the telephone number to create individual level Linkage Keys.

IV. Process Description

As discussed above, embodiments of the system include several processes for linking data across the Internet. In one embodiment, Linkage Key input parameter values (LKIPVs) are provided to an information system which converts the LKIPV to a Linkage Key. The Linkage Key is then used to search a wide variety of informational databases, such as those described below in reference to FIG. 4. The LKIPV is provided to the information system directly by the consumer or through a predefined process. For example, in one embodiment, the LKIPV is lat/lon coordinates provided from GPS data received by a GPS receiver linked to a mobile computer or wireless telephone.

In one preferred embodiment, as described below, a LKIPV is stored and retrieved from a cookie data file on the consumer's computer. In this embodiment, the process of linking information begins when a consumer enters information, such as a name, address or telephone number into a browser that is attached to a server on the Internet. Although the following discussion relates to "consumers" and "merchants", this system is extensible to linking information between any two or more entities. For example, an employee and employer, a student and educational institution or the like could use the system and process described herein for linking information.

However, using the consumer/merchant example, once the consumer has completed filling out an electronic form displayed by their browser software, the data entered by the consumer is sent to the merchant computer. The merchant computer then creates an HTML page containing an image reference which transfers the HTML stream to the Information System (IS) web server 36 so that a cookie can be written to the consumer's computer by the IS web server 36. Before writing the cookie, the system passes, for example, the address that was entered on the form to the address translation server 32 in order to generate a DPC unique key corresponding to the entered address. The DPC key, along with a unique consumer identification number and current date and an optionally coded name like that described in the voice recognition server above are then saved to a persistent cookie on the consumer computer. Thus, the consumer computer now includes a cookie data file, having an encoded address Linkage Key, that can be read by the IS web server 36.

Alternatively, once the consumer makes a request to receive the form, the merchant computer can immediately redirect the consumer to the IS web server 36 so that the form actually is sent from the IS web server to the consumer. In this manner, once the data is entered into the form by the consumer, the IS web server 36 writes the desired LKIPV and/or Linkage Key to the consumer's computer, and then redirect the consumer's browser back to the originating merchant server.

Figure 2:
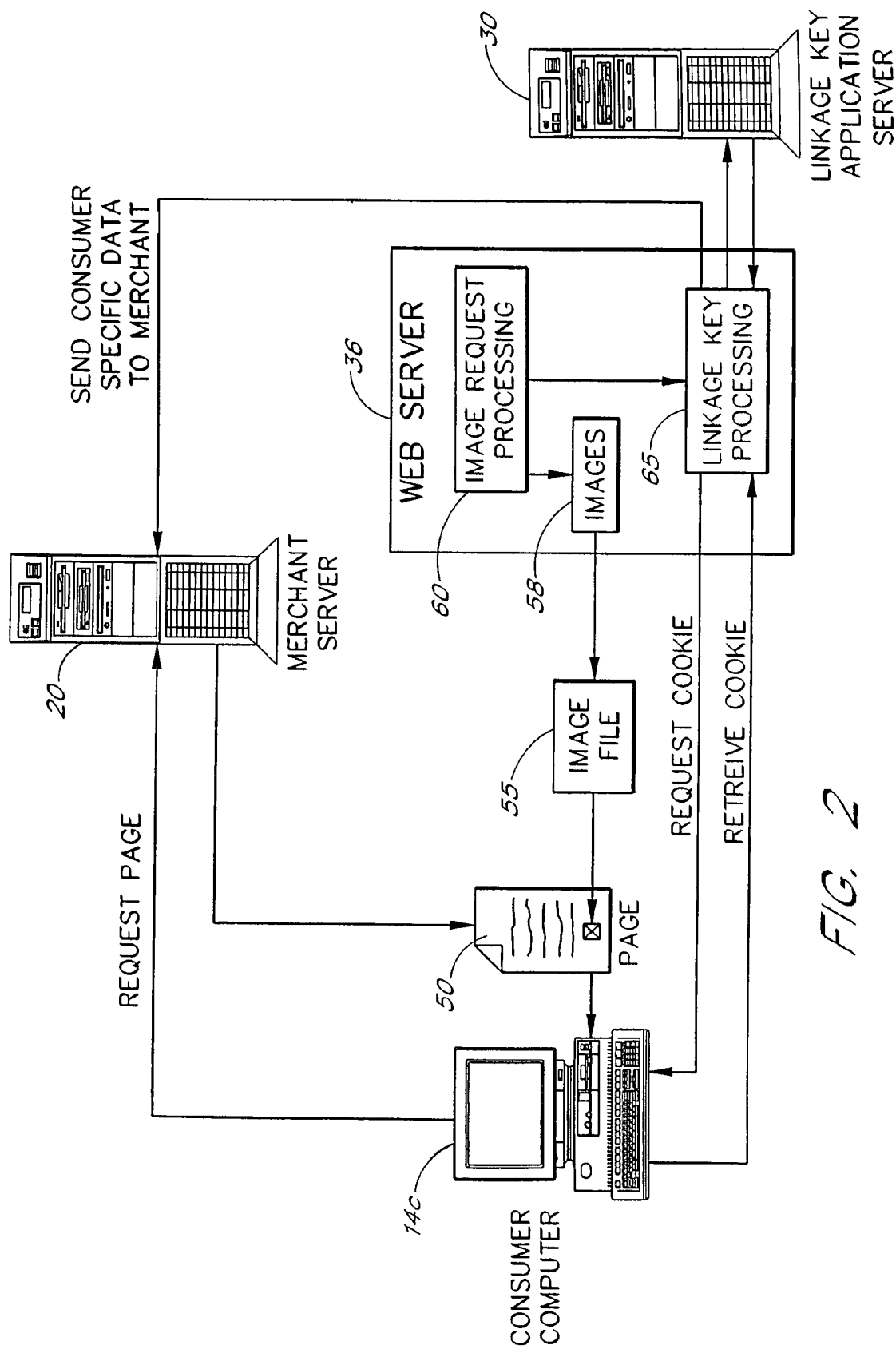
FIG. 2 is a block diagram illustrating one embodiment of a process for using embedded images to identify consumers in a system for linking data.

Referring to FIG. 2, a process of providing data to a merchant server 20 is illustrated. As shown, a consumer that is working on a consumer device, such as a computer 14C requests an Internet page from a merchant server 20. This request is made by pointing the consumer's browser software to the Universal Resource Locator (URL) of the merchant server 20. A default page 50, normally "index.html" is then transmitted to the consumer computer 14C.

Within the default page 50 is a reference to an image file 55 that is stored on the IS web server 36, so it can be displayed within the default page 50. As the browser on the consumer computer receives the default page 50 to display, it comes across the reference to the image file. The browser opens a connection to the web server 36 so that it can retrieve and display the image that is stored in the image file. One example of the HTML script to provide such an image transfer is illustrated below.

```
<html>
<head>
<title>Cookie baking via image</title>
</head>
<body bgcolor="#ffffff">
<div align="center">
<img src="http://192.168.3.22/cgi-bin/cookie">
</div>
</body>
</html>
```

As the browser makes a request to the web server for the image file 55 from a database of images 58, an image request processing module 60 is initialized. The image request processing module 60 includes a set of instructions for reading and/or writing a cookie data file to/from the consumer computer that has requested the image file 55. One example of a CGI/Perl script to exchange the cookie and download the images is as follows:

```
#!/bin/perl
$Image="nocookie.gif";
if ($ENV{'HTTP_COOKIE'} =~ /Cookie=Test/)
{
    $Image="gotcookie.gif";
}
if (open(INFILE, $Image))
{
    print "Content-type: image/gif\n";
    if ($ENV{'HTTP_COOKIE'} =~ /Cookie=Test/)
    {
        print "\n";
    }
    else
    {
        print "Set-Cookie: Cookie=Test\n\n";
    }
    while ($line = <INFILE>)
    {
        print "$line";
    }
    close (INFILE);
else
{
    print "Content-type: text/plain\n\n";
    print "Could not open image file [$Image]\n";
}
```

Thus, the image request processing module attempts to read one of its own persistent cookie data files from the consumer computer. As mentioned previously, a server can only read one of its own cookie data files. Other servers cannot read a cookie data file that they did not write.

It should also be noted that each merchant server that is part of the system can include a different parameter in the image reference URL in their default page. Thus, depending on the image that is being requested, the IS web server can identify the merchant that desires information on the consumer that has browsed their site. This provides a mechanism for transmitting different types of information to each merchant.

Because each merchant may want different types of information on consumers that browse their site, the image request processing module first identifies the merchant whose image has been requested, and then determines the type of consumer data required. For example, some merchants might want to know the median income level of the consumer's home neighborhood, while other merchants may want to know whether the consumer lives near water.

Stored within the cookie data file is a LKIPV, such as a telephone number or encoded address that can be used to determine information on the consumer that has accessed the merchant site. The information desired by the merchant is therefore determined by gathering the LKIPV relating to, for example, the encoded home address of the consumer from the cookie data file. This LKIPV is then either used directly, or is translated into a Linkage Key and then sent through the Linkage Key processing module 65 to the Linkage Key application server 30 to find databases of median income levels and geographic locations.

Note that this data lookup can be done without the consumer being aware that their browser was ever connected to a third party URL, or that a cookie has been read from their system unless the user has cookie notification turned on in their browser. Because the image request processing module reads all of the data from the cookie, it can retrieve any LKIPVs or Linkage Keys that have been stored within the cookie data file.

After the desired data has been determined, the consumer's browser is sent an image to display within the page. The image can be a pre-determined image from the merchant server, or only a single pixel that is virtually undetectable on the consumer's displayed page. In addition, the "last access date", or other information in the cookie data file is preferably updated to reflect the latest access by the web server. Thus, the consumer is able to view the image that has been requested by their browser.

Moreover, the merchant server 20 is then provided with the information it desired on the consumer by searching the linkage server with the Linkage Key derived from the cookie data file. The merchant server might then, for example, display advertisements for higher priced products to a consumer that was found to live in a high median income level area.

In order for the merchant server to determine information on a plurality of consumers at the same time, when the image is requested from the web server, the merchant can add an additional parameter representing a unique transaction identification string to the request. In this embodiment, the string is stored by the web server, and then sent back to the merchant server when the requested data has been determined. This provides a mechanism for managing hundreds or thousands of consumer requests without having to perform the requests sequentially.

Figure 3:
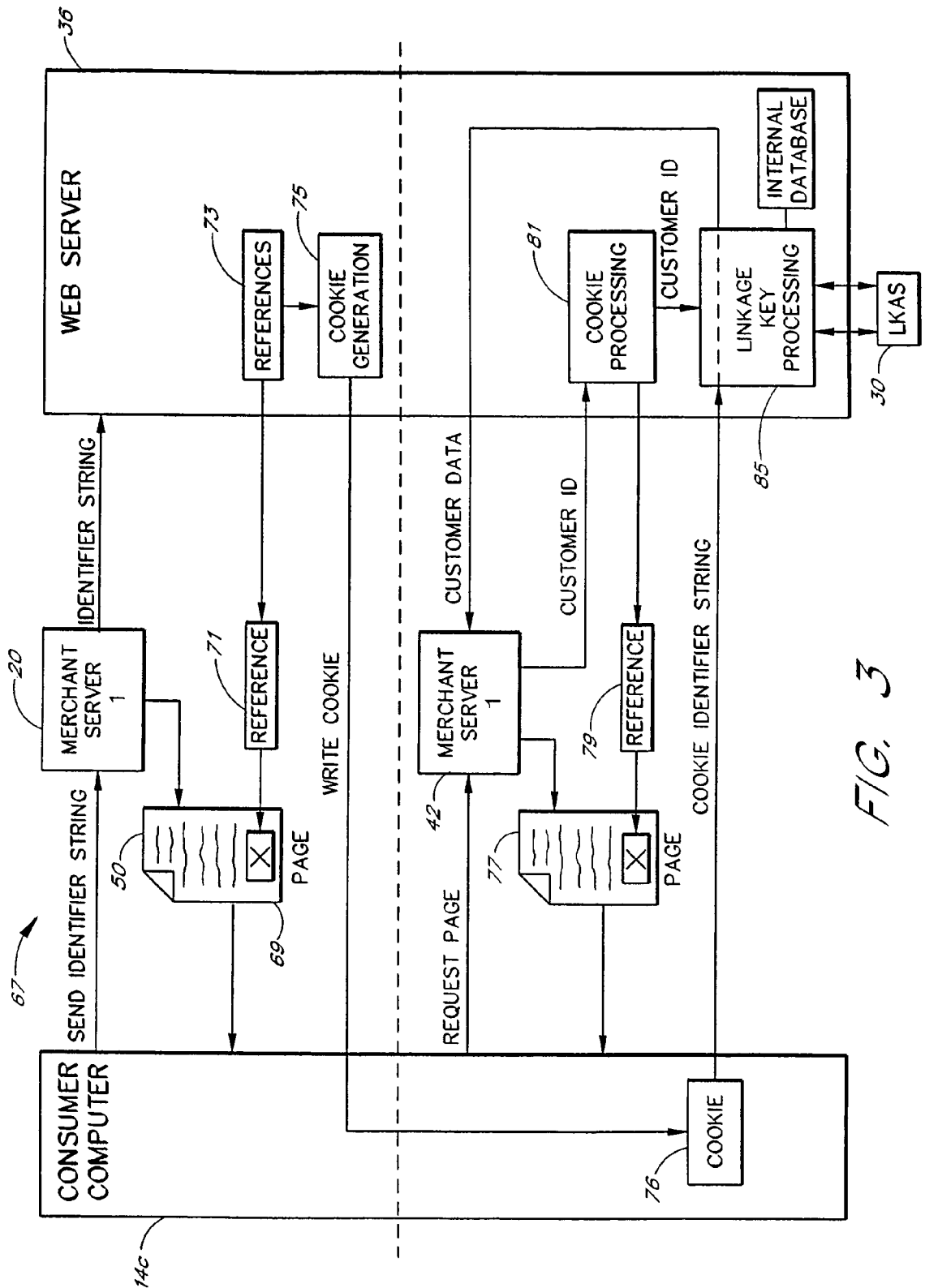
FIG. 3 is a block diagram illustrating one embodiment of a process for using Internet cookie data files to identify consumers in a system for linking data.

Referring now to FIG. 3, another embodiment of a system 67 for providing consumer data to a merchant server is illustrated. As shown, the consumer computer 14C connects to the merchant server 20. As the consumer computer connects to the merchant server 20, an identifier string, such as a telephone number, address or lat-lon string is sent to the merchant server 20. The identifier string might be sent, for example, as part of a form being filled out by a consumer using the consumer computer 14C. Once the merchant server 20 has received the identifier string, a response page 69 is sent to the consumer computer 14C.

Included within the response page 69 is a reference 71 to an image or file on the web server 36. The reference 71 includes a universal resource locator (URL) to a set of references 73 within the web server 36. As illustrated, the references 73 are linked to a cookie generation module 75 that includes instructions for writing a cookie data file 76 to the consumer computer 14C. These instructions can be written, for example, in a CGI or Perl script as is known in the art and exemplified above. As has been discussed previously, the cookie generation module 75 includes instructions for determining a LKIPV that is to be stored in the cookie data file to be written to the consumer computer 14C. For example, the cookie generation module 75 can be linked to the USPS translation server 32 in order to translate an address into a unique identification code. In addition, the LKIPV can be a telephone number that was gathered from the identifier string sent to the merchant server.

In a separate process, the consumer computer 14C requests a page from a second merchant server 42. The merchant server 42 returns the requested page 77 to the consumer computer 14C. As illustrated, the page 77 includes a reference 79 that points to a cookie processing module 81 within the IS web server 36. It should also be noted that the merchant server 42 sends a consumer identification string that has been generated for the consumer computer to the cookie processing module 81. The consumer identifier string is preferably a unique identifier that is used by the merchant server 42 to identify the consumer computer that has requested the page 77. Accordingly, each consumer computer that accesses the merchant server 42 will be assigned a new consumer identifier number during each new session with the merchant server.

Because the reference 79 comes from the IS web server 36, the consumer's browser is automatically directed to the IS web server. Once the IS web server begins a session with the consumer computer, the cookie data file 76 that was previously stored on the consumer computer 14C can be read. Instructions within the cookie processing module 81 can retrieve an identifier string, such as a LKIPV from the cookie data file 76 and return it to a spatial key processing module 85 within the web server 36. Within the spatial key processing module 85 are instructions for linking the consumer identifier and the cookie identifier string together. The information within the cookie identifier string includes the LKIPV that was previously stored within the cookie data file 76. This value is then used as an input to the LKAS 30 in order to search and retrieve consumer data to the merchant server 42.

Once consumer data has been retrieved from the LKAS 30, it is sent along with the consumer identifier from the Linkage Key processing module 85 to the merchant server 42. Because the merchant server 42 generated the consumer identifier that was used in retrieving the consumer data, the merchant server 42 can link a particular consumer session with the data retrieved from the Linkage Key processing module 85. In this manner, the merchant server 42 is able to analyze consumer data relating to the consumer computer 14C.

In one example, the cookie identifier string includes the telephone number of the consumer that owns the consumer computer 14C. That telephone number is sent to the spatial key processing module which, by linking to the LKAS, determines the income level of the neighborhood served by the telephone number by comparing it with the LKAS 30. Once the income level of a neighborhood relating to the retrieved telephone number is determined, it is forwarded to the merchant server 42, along with the consumer identifier string so that the merchant server 42 will be appraised of the income level of the consumer currently browsing their server. By using this information, the merchant server 42 can provide either higher or lower cost products to the consumer as they browse the merchant server 42.

A. I.Description of a Virtual Database Using a Linkage Key

Figure 4:
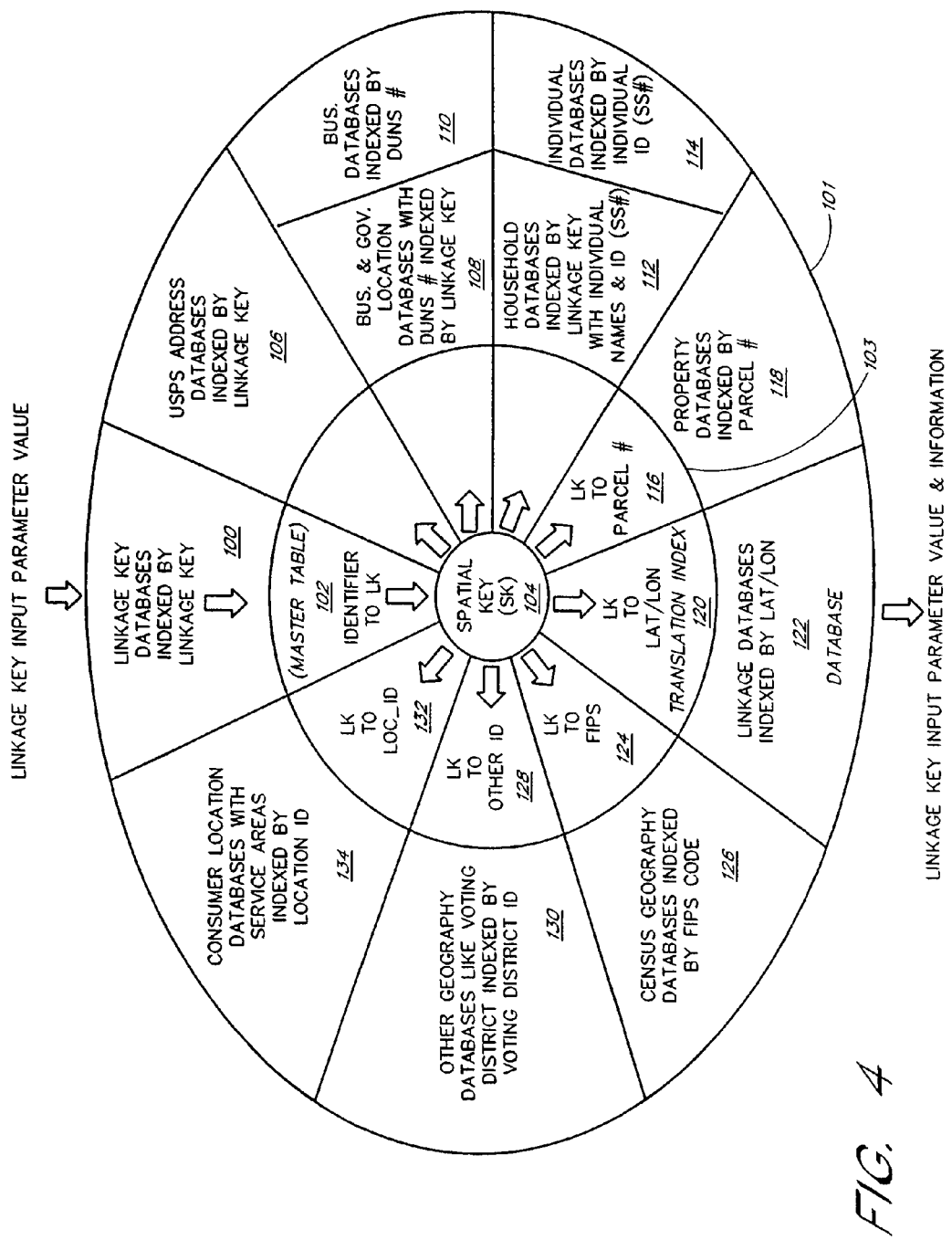
FIG. 4 is a block diagram illustrating one embodiment of a database system for linking Linkage Keys to consumer data.

FIG. 4 illustrates how the data stored within a cookie data file can be linked to an almost unlimited amount of consumer data. Traditionally, for most merchants doing business on the Internet, there has been a very limited amount of data available on consumers that are browsing their web sites. However, FIG. 4 illustrates many different types of databases in an outer database ring 101 with their corresponding Linkage Key Translation indices shown in a middle ring 103. Three of the database types (106, 108 and 110, and 112 and 114) do not have a corresponding Translation index because they are indexed by a Linkage Key making the Translation index unnecessary. For descriptive purposes, a Linkage Key indexed database is defined to be any database that is accessed directly via the Linkage Key or indirectly through a Linkage Key Translation index.

Referring to FIG. 4, a functional flow using Linkage Key linkage technology will be described. A consumer's identifier, such as an IP address, e-mail address or a 10-digit telephone number, or street address from a cookie data file, are passed to a process for updating, validating, classifying, standardizing and screening that utilizes, in one embodiment, a set of Consumer Identifier Databases Indexed by Identifier 100. The resultant processed identifier is used to access an Identifier to Linkage Key translation table or process to determine a Linkage Key 104. The Linkage Key 104 using the USPS DPC embodiment is then used to directly access data in the databases (e.g., 106, 108 and 110, and 112 and 114) that do not require a translation index. Otherwise, the Linkage Key is used by a translation index to retrieve a secondary index (e.g., voting district ID from index 128) for accessing databases (e.g., 118, 122, 126, 130, 134) requiring a translation index. The resultant database information and the consumer's identifier are then used to provide a merchant or other third party with the desired information. In cases where the Identifier is the Linkage Key processes 100 and 102 are not required. In other embodiments of the Linkage Key some of the illustrated translation indexes are not requirement and some of the database shown might not be accessible using a different linkage key embodiment.

The consumer identifier to Linkage Key Translation process 102 could be combined with the Linkage Key indexed databases by an offline merge, append and/or link process to create identifier indexed databases containing all of the above illustrated information.

FIG. 4 illustrates a one-way linkage starting with an identifier of a consumer. Referring to FIG. 4, one skilled in the art would understand that the Linkage Key technology is useful for applications that do not start with an identifier that originated in a cookie data file. For example, a wireless telephone having an internal GPS receiver could provide the database system with an identifier and a Linkage Key relating to the lat/lon location of a consumer.

The specifics for each database type (of FIG. 4) in terms of data components, sources, Linkage Key coding and maintenance issues will be discussed in detail in the following sections.

a. Identifier Databases Indexed by Identifier (100, FIG. 4)

There are several types of databases that fall within this category. In one embodiment, the identifier is a telephone number. In this embodiment the identifier database is a telephone identifier database that is indexed by telephone number. This embodiment includes a database having telephone number changes, verification and classification databases; consumer specific consumer databases; and negative or inverse lists. These databases are preferably updated monthly, and then synchronized to a given date in the month. The 15th of the month is the preferred date, but any day could be selected.

Regarding telephone number changes, verification and classification, the official source is Telecordia. They publish a variety of publicly available files, with the most comprehensive being the Local Exchange Routing Guide (LERG) files and their derivatives. Telecordia releases files on a monthly basis. The date that NPANXXs change, are added or are deleted is provided with the files. The files must be updated monthly to coordinate the changes that will occur in the following month.

The Identifier Databases Indexed by Identifier generally indicated at 100 (FIG. 4) comprise several files, lists, or databases. The telephone related embodiments preferably include a NPANXX Split file, a LERG6 file, a V&H Coordinate file, telephone company LIDB, one or more Consumer databases, and a Negative database. This process can be considered a detailed expansion of block 100 (FIG. 4). Other databases may be utilized in other Identifier embodiments.

b. Identifier to Linkage Key Translation Process/Table (102, FIG. 4)

The completeness, currency and accuracy of the translation table/process is important to the efficiency and functionality of all applications. In order to build and maintain the most complete, current and accurate translation possible for the telephone number to DPC embodiment, the table/process preferably uses multiple sources for cross verification. In addition, since in one embodiment, the table/process is designed to be used by both regulated and non-regulated entities in the regulated telephone network, none of the translation data can be consumer provided network information.

There are four separate processes to build and maintain the Telephone number to DPC Master Table. These processes are as follows:

1. Process for Data Provider to Provide Master Table Verification Records
2. Process to Build Master Table Update Records from Data Provider Supplied Verification Records
3. Master Table Update Preprocess
4. Master Table Update Process These Master Table build and maintenance processes are further described in Applicant's patent entitled "One Number Intelligent Call Processing System", U.S. Pat. No. 5,901,214 which is herein incorporated by reference. Other embodiments use different methods to perform this translation. For example USPS addresses are converted to DPC codes by an address standardization and coding process.

C. Spatial Key (104, FIG. 4)

One preferred Spatial Key is the USPS DPC used to link databases together.

d. USPS Address Databases Indexed by Spatial Key (106, FIG. 4)

There are two USPS databases required to build a USPS CASS certified address from a DPC Linkage Key: a City State file and a ZIP+4 Address Coding Guide. There is one City State detail record for each 5 digit ZIP code and one or more ZIP+4 Addresses Coding Guide records for each unique ZIP+4. The ZIP+4 Address Coding Guide contains multiple records in a situation where there is a multiple set of secondary address ranges associated with a single ZIP+4.

e. Business and Government Location Databases Indexed by Spatial Key Containing DUNS Number (108, FIG. 4)

A preferred Business and Government Locations File 108 is a DUNS file. The ten million plus record file contains a business or government name and both a physical and mailing address, if they are not both the same. Each address is run through DPC coding software and an 11 digit ZIP Code is assigned with a one digit check digit. This becomes the Linkage Key and a file index is created on this key.

It is now a basic process to look up a Linkage Key in the file and retrieve the location record data associated with the Linkage Key, including the location's DUNS number and its parent's DUNS number if the location is owned by a higher level corporate entity.

f. Business Database Indexed by DUNS Number (110, FIG. 4)

The DUNS' numbers retrieved above (database 108) can then be used to access a DUNS Corporate database 110 to obtain names of corporate officers and credit history information. This is very valuable in many types of business to business transactions.

g. Household Databases Indexed by Spatial Key Containing Individual Names and IDs (Social Security Number) (112, FIG. 4)

A preferred Household database 112 is ACXIOM's OMNIBASE database. This 100 million plus record database is Linkage Key coded and indexed as described above. For each household record it contains many household characteristics, such as name of head of household, date of birth of head of household, estimated household income, and so forth. It also links to 265 million individuals known to be associated with one or more households. For each individual, the database contains their name, date of birth, social security number, driver's license number and other similar data.

It is a straightforward process to look up a Linkage Key in the OMNIBASE database and retrieve the associated household and individual data. Another application that is conducive to hierarchical Linkage Key retrieval from the database is a nearest neighbor application.

There are also consumer household consumption and fraud databases maintained by companies such as Abacus for catalog companies, and Equifax for insurance companies that can also be accessed in this same manner.

h. Individual Databases Indexed by Individual ID (Social Security Number) (114, FIG. 4)

There are three major individual databases 114 that are indexed by social security number: TRW, Equifax and TransUnion (TU). The preferred database is the TU database. Once an individual's social security number has been retrieved from above (database 112), it is a basic process to use the social security number as a means of retrieving credit and public record data associated with the social security number from the TU database.

Commercial ventures, such as R. L. Polk and some states provide access into their driver license databases based on knowing a driver's license number. Again, once this is retrieved from database 112 above, it is a basic process to access this data. This data contains driving history, and in some cases, linkage to vehicle registration data. An automobile make and model associated with the household and individuals can be retrieved from the vehicle registration data.

i. Linkage Key to Parcel Number (116, FIG. 4)

A Linkage Key to Parcel Number Translation index 116 is created by ACXIOM by extracting property address, owner address and parcel number from the DATAQUICK database. The parcel number is usually the FIPS Code of a local government entity responsible for managing title and/or property taxes to real property plus the locally assigned parcel number. The addresses are Linkage Key coded as previously described and the Parcel Number Translation database is created with the following fields and indexed by Linkage Key:

Linkage Key

Parcel Number (government entity code+local parcel number)

Spatial Key Type Code (O=Owner or P=Parcel)

It is a straightforward process to index a Spatial Key into this Translation database and retrieve all parcel numbers associated with the Spatial Key.

j. Property Database Indexed by Parcel Number (118, FIG. 4)

The ACXIOM DATAQUICK database is indexed by parcel number based on parcel number(s) retrieved above from index 116. Information, such as owner, liens, mortgage amount, mortgage lender, purchase date is available for the individual parcel or all the parcels associated with the owner's tax address.

k. Linkage Key to Latitude and Longitude (120, FIG. 4)

A preferred Linkage Key to Latitude and Longitude database 120 is the GDT ZIP+4 to Latitude and Longitude file. This database is currently updated quarterly. Latitude and longitude are provided in NAD83 in millionths of a degree. Each record also contains the USPS ZIP+4 type and the precision with which that latitude and longitude were assigned: ZIP+4 centroid, ZIP+2 centroid or ZIP centroid. There are approximately 28 million street, firm and high-rise ZIP+4s that have been latitude and longitude coded to their ZIP+4 centroid by matching against enhanced TIGER files called DYNAMAP.RTM., available from Geographic Data Technology, Inc. (GDT). This file is indexed by ZIP+4 and it is a straightforward process to lookup a ZIP+4 on the file and retrieve the latitude and longitude associated with the ZIP+4.

GDT also provides a ZIP+6 or DPC to Latitude and Longitude file. This is the most precise translation file and can be incorporated into the system without any modifications other than changing the size of the key from 9 digits to 11 digits.

l. Spatial Databases Indexed by Latitude and Longitude Quadtree (122, FIG. 4)

There are many types of spatial databases 122 available from many different sources. In general, they are classified into 0-D, 1-D and 2-D databases and networks. The terms 0-D, 1-D and 2-D correspond to the number of dimensions: a zero dimensional database contains points such as the latitude and longitude point where two or more street segments intersect; a one dimensional database is a database of line segments, e.g., two latitude and longitude points connected by a straight line, such as the street segment connecting one intersection to the next intersection; and a two dimensional database is a database of areas defined by polygons or circles, such as a census block defined by a three or more point latitude and longitude polygon boundary. A general definition of a GIS or spatial network is a system to link related 0-D, 1-D and 2-D databases together. For example, the GIS network provides the means to know what other street links connect to a starting street link, what other links or points the link crosses, and what areas the link borders or crosses. A spatial database is not like other databases and has three components: the spatial data, the spatial network and a spatial data network interface or application program interface (API).

Consequently, there are many different proprietary spatial database network designs with various strengths and weaknesses. Unfortunately, spatial data cannot always be moved from one network design to another without some distortion, and there is no "best" spatial database and network for all applications.

Fortunately, from an API perspective, almost all spatial database systems will accept one or more 0-D, 1-D, and/or 2-D latitude and longitude defined inputs and return a result that can be easily handled by the calling application. For example, in the area of driveable street directions and maps, the preferred spatial database system is from ETAC which specializes in automobile navigation systems. In most major markets, ETAC has enhanced the TIGER files by classifying streets by type, identifying one way streets and streets with no right or left turn restrictions. ETAC's street information, network design and API were created primarily to provide driving directions in the form of text or various resolution street maps stored as bitmaps. This makes ETAC a clear supplier for GIS applications related to providing driveable directions and street maps.

On the other hand, in terms of general spatial database processing platforms supported and spatial database manipulation, Environmental Systems Research Institute, Inc. (ESRI.RTM.) in Redlands, Calif. has no equal to its ARCINFO product. Many spatial database providers such as GDT provide their spatial data in ARCINFO format, as well as formats to support SMI and MapInfo.

There are many specialized spatial database suppliers. For example, Vista Environmental provides 0-D and 2-D environmental data for underground storage tank locations, hazardous waste spill locations, hazardous material storage locations and hazardous material dump site areas. There are other spatial database providers that have spatial databases of shopping centers, financial institutions with deposits, restaurants by type, ATMs, drop boxes, fire hydrants, weather stations, traffic reporting areas, flood planes, earthquake fault lines, power lines and so forth.

Information from all these databases is now accessible by simply passing a latitude and longitude definition, an information request and a returned information format request to the GIS API.

m. Linkage Key to FIPS Code (124, FIG. 4)

A preferred Linkage Key to FIPS Code (census block) database 124 is a GDT ZIP+4 to 1990 Census Block file. This file is currently updated quarterly. The ZIP+4 can change monthly, while the census blocks change only with each decennial census.

This file is indexed by ZIP+4 and it is a straightforward process to look up a ZIP+4 on the file and retrieve the census block associated with the ZIP+4. In a very small percentage of cases, there can be two or more census blocks associated with a ZIP+4.

n. Census Geography Databases Indexed by FIPS Code (126, FIG. 4)

In terms of Census Geography databases 126, there are four different types: most recent census data, updates and projections, geodemographic systems and other data reported by census geography.

The preferred source for the most recent (e.g., 1990) census small geographic area data is the U.S. Census Bureau. They publish two sets of small area data files called the Summary Tape Files (STF). These files are divided into two groups: 100% count data, published as STF1 data and sample data, published as STF3 data. STF1 data is available for each of the 6.3 million census blocks and higher level geographies. Each geography record contains several hundred demographic variables, such as population counts by race and age and household counts by property value. The STF3 files are published for the 223 thousand census block groups and higher level geographies. Each geography record contains an additional several hundred demographic variables, such as average household income and counts of head of households by age and by income.

In terms of updates and projections, there are two major suppliers with equal reputations: Claritas and Equifax National Decision Systems. These suppliers recently merged and provide current year estimates and five years projections for population, households, population by age, households by income, head of household age by income and other data for block group geography and above.

Again, both Claritas and Equifax National Decision Systems provide geodemographic systems. A geodemographic system is a classification system where each geographic area is classified into a single code based on the demographic and other characteristics associated with the geographic unit. There are usually between 40 and 100 unique sequential numeric codes in a geodemographic system. These systems were initially available for only census geography, but are now available for both census geography and postal geography as well as the household level. The value of the system is that there are individual company consumer databases and syndicated panel databases containing as many as 50,000 panel members from suppliers such as Simmons, National Panel Data (NPD) and Mediamark Research Institute (MRI). Based on the consumer or panel member address, they are assigned a geodemographic code. These consumers or panel members have purchased products or filled out questionnaires on products and services. These panel databases are tabulated by geodemographic code and by product creating geodemographic consumption propensity tables of several thousand products and/or services with purchasing rates by geodemographic code. This data is readily accessible by looking up a FIPS code in a census geography database and retrieving the geodemographic code. Then by looking up the geodemographic code in the geodemographic consumption propensity table, the consumption propensity for the desired product or service can be retrieved or computed.

There are special databases that are provided by government agencies such as the Federal Deposit Insurance Company (FDIC). The FDIC requires all FDIC controlled lending institutions to report all applications for home mortgage loans by age, race, loan amount, loan status and the census tract of applicant property. The FDIC publishes this data in an electronic form on a quarterly basis. This data is tabulated by census tract and provided by companies such as Claritas and Equifax.

All the above-mentioned data is readily accessible by looking up a FIPS code in a Census Geography database and retrieving the desired dependent data.

o. Linkage Key to Other ID (128, FIG. 4)

In addition to census geography codes and latitude and longitudes, the TIGER files also containing voting precinct codes and school district codes for each street link. The same process used by GDT and others to create a ZIP+4 to Census Block file can also be used to create a ZIP+4 to Voting Precinct file and a ZIP+4 to School District file, for example. These files have not previously been created because of lack of demand. However, there will most likely be a ZIP+4 to Voting Precinct file available from GDT prior to a general election. By indexing this file by ZIP+4, it is a straight forward process to look up a ZIP+4 on the file and retrieve the voting precinct associated with the ZIP+4.

p. Other Geography Database such as Voting District Indexed by Voting District ID (130, FIG. 4)

There are statistical summary files from governmental agencies that provide the number of registered voters by party and by voting precinct. For example, as a general election gets closer, both parties and news agencies will seek public opinion on various issues and candidates. Using a 800 or 900 number, callers or web site voters placing votes can be tabulated in real time and the caller's precinct dependent data can be looked up and statistically modeled to provide national level estimates and voting statistics by party.

q. Linkage Key to Location ID (DNIS Dependent Consumer Table) (132, FIG. 4)

This translation table is called a Consumer Table 132 and the procedure for building it is described in detail in Applicant's patent entitled "Automatic Routing System for Telephonic Services", U.S. Pat. No. 5,506,897, which is hereby incorporated by reference. In summary, a Consumer Table record is created for each ZIP+4 that spatially lies inside a service location's service area defined as a geographic area of any size and shape. This process is repeated for each service area and the resultant file is sorted and indexed by ZIP+4 creating the Consumer Table. The Consumer Table can be indexed by ZIP+4 to retrieve a service location ID. There is one Consumer Table per Consumer that is identified by the DNIS.

r. Consumer Locations Databases with Services Areas of Any Size or Shape Indexed by Location ID (134, FIG. 4)

These are basic "one record per service location" databases 134 indexed by Location ID. They can contain almost any type of service location data, such as, but not limited to, the following: name, address, latitude/longitude, service area type and latitude/longitude definition, telephone number, FAX number, E-Mail address, days and hours open, micro area directions, store promotions and events, and store product inventories or menus and prices. There is one Consumer Locations database 134 per consumer that is identified by DNIS.

B. Gathering Consumer Data from an Input Device

Figure 5:
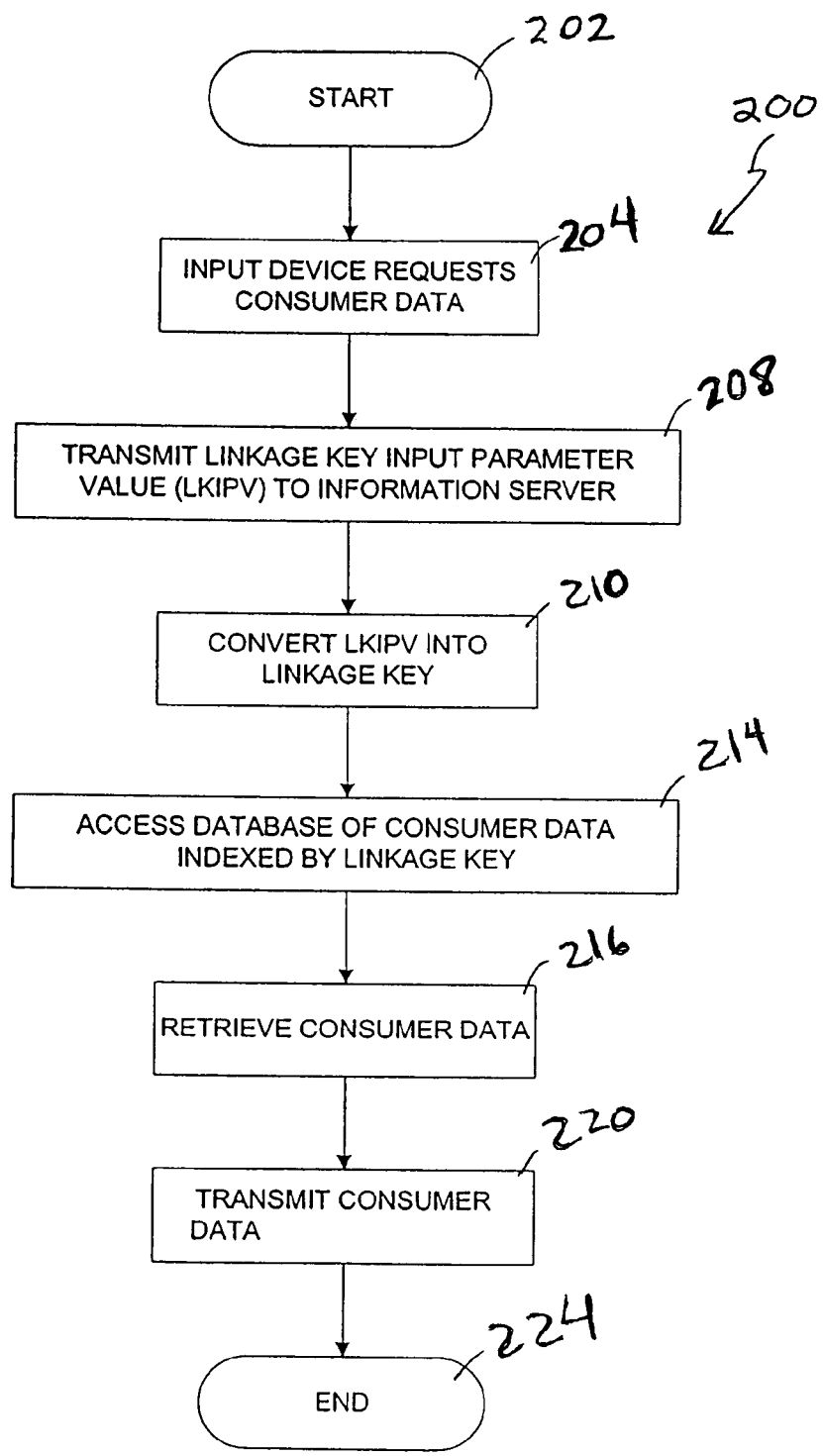
FIG. 5 is a flow diagram illustrating one embodiment of a process for retrieving consumer data from an input device.

Referring now to FIG. 5, a process 200 of gathering consumer data from an input device is illustrated. The process 200 begins at a start state 202 and then moves to a state 204 wherein an input device requests consumer data. As discussed previously, the input device could be a wireless telephone, television, personal computer, interactive voice response system or third-party database server. In addition, the input device could be a personal digital assistant such as those made by 3 Com, Microsoft and others.

Once the input device has made a request to receive consumer data, the process 200 moves to a state 208 wherein a Linkage Key input parameter value is transmitted to the information server 25. The process 200 then moves to a state 210 wherein the LKIPV is converted into a Linkage Key.

A Linkage Key is then used at a state 214 to access the appropriate database of consumer data that is indexed by Linkage Keys. Illustrations of such databases are described above with reference to FIG. 4. The process 200 then moves to a state 216 wherein consumer data from the database is retrieved using the Linkage Key. The process 200 then moves to the state 220 wherein the consumer data is transmitted to the appropriate device.

In one example, the consumer data is transmitted to the originating input device. In another example, the transmitted consumer data is sent to a merchant server. Of course, it should be realized that embodiments of the invention are not limited to particular systems which receive the consumer data. The process then ends at an end state 224.

C. Linking Consumer Data to a Merchant

Figure 6:
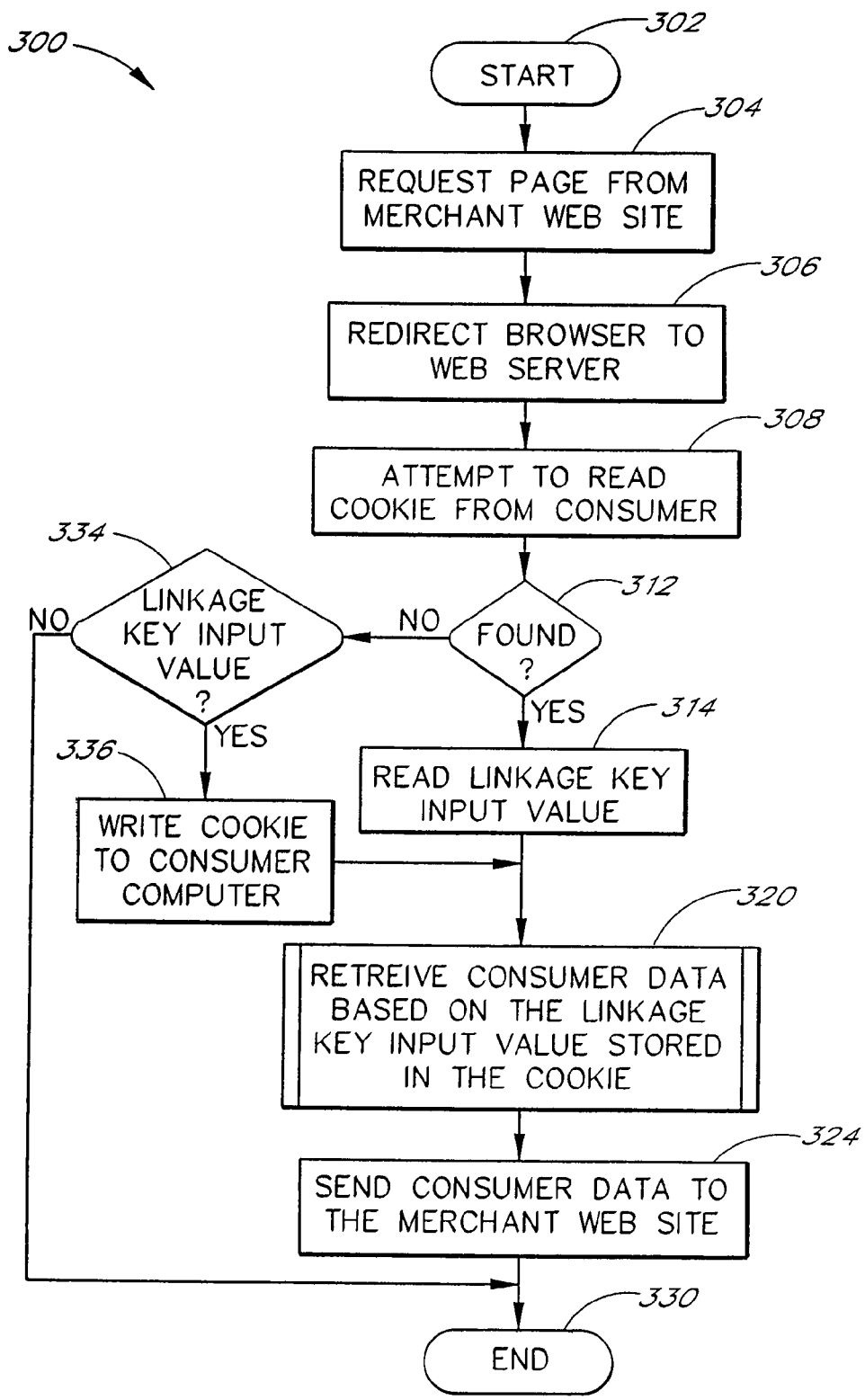
FIG. 6 is a flow diagram illustrating one process for linking data between a consumer and a merchant across the Internet.

Referring now to FIG. 6, a process 300 of linking consumer data with a merchant server is explained. The process 300 begins at a start state 302 and then moves to a state 304 wherein a page request is made by a consumer for a merchant web site. The process 300 then moves to a state 306 wherein the consumer's browser is connected to an Information System web server. Several mechanisms for connecting to web servers have been explained above in relation to FIGS. 2 and 3. For example, the requested page can include a reference or image that resides on the web server. When the requested page is retrieved from the merchant web site, the consumer's browser is temporarily connected to the IS web server in order to download the referenced file or image.

Once the browser has been connected to the IS web server at the state 306, the process 300 moves to a state 308 wherein the IS web server attempts to read a cookie data file from the consumer's computer. A determination is then made at a decision state 312 whether a cookie has been found on the consumer's computer.

If a cookie is found on the consumer's computer, the process 300 moves to a state 314 wherein the identifier stored within the cookie data file is read by the IS web server. The process 300 then continues to a process state 320 wherein consumer data based on the identifier retrieved from an external or internal database. This process is explained more fully in FIG. 7. Once the consumer data has been retrieved at the process state 320, the consumer data is forwarded to the merchant web site at a state 324. The process then terminates at an end state 330.

If a determination was made at the decision state 312 that no cookie data file was found on the consumer's computer, the process 300 moves to a decision state 334 wherein a determination is made whether an identifier is known for the consumer. If an identifier is not known, the process 300 terminates at the end state 330. However, if an identifier is known, such as being captured from a form page, then the process 300 moves to a state 336 wherein the identifier is incorporated into a cookie data file which is written to the consumer computer. The process 300 then continues to the process state 320 in order to retrieve consumer data based on the identifier.

Figure 7:
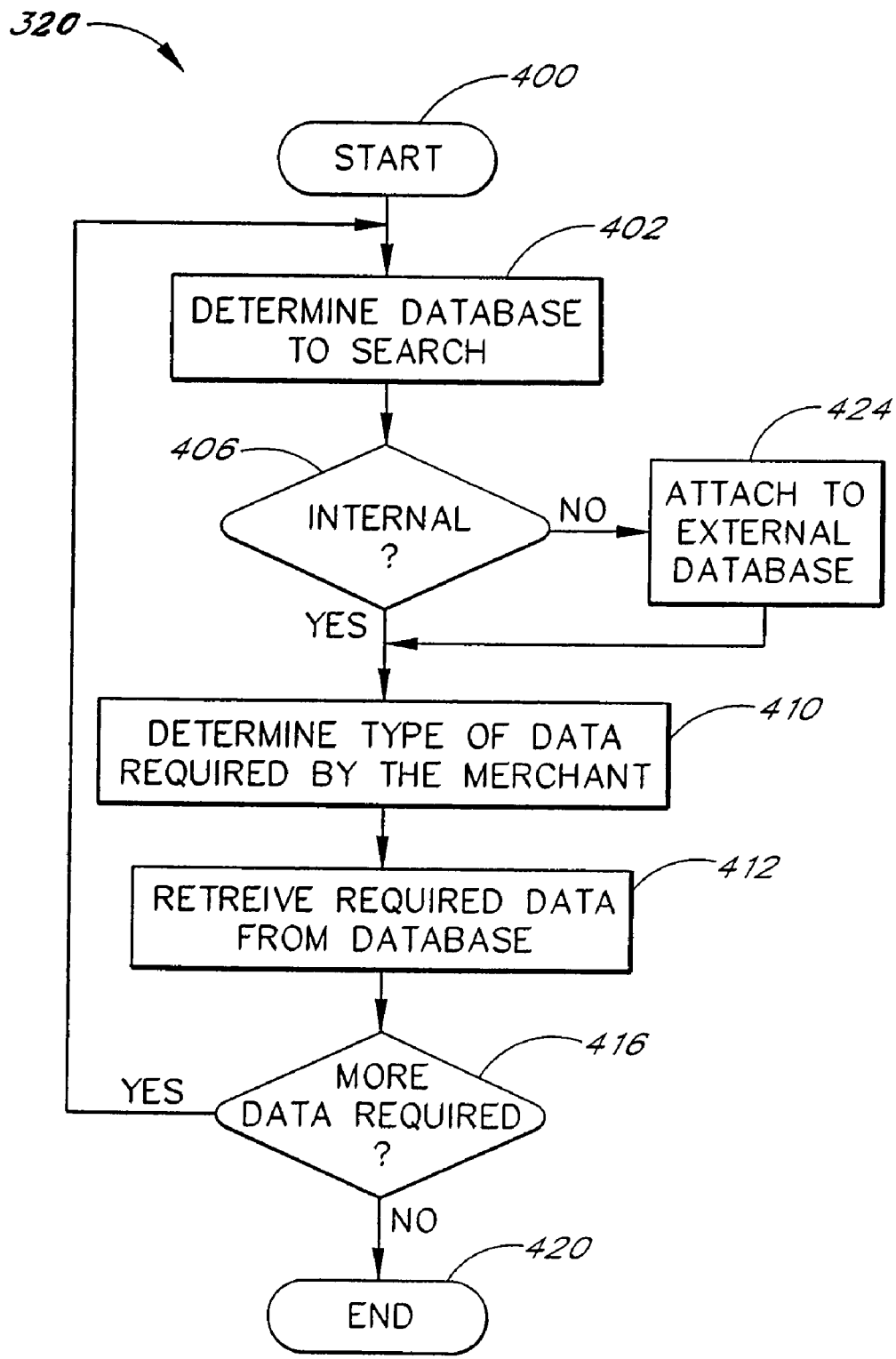
FIG. 7 is a flow diagram illustrating the Retrieve Consumer Data Based on the Linkage Key Stored in the Cookie process of FIG. 6.

Referring now to FIG. 7, the process 320 of retrieving consumer data is explained more completely. The process 320 begins at a start state 400 and then moves to a state 402 to determine which database to search with the retrieved identifier. As explained previously, each merchant server that is part of the system 10 might wish to retrieve different consumer data for each consumer accessing their merchant web site. Thus, while a first merchant might want to retrieve the median income level of the consumer, another merchant web site might wish to retrieve the average age of the consumer searching their web site.

Once the proper database to search has been determined at the state 402, a decision is made at a decision state 406 whether the database to search is within the information system 25. If a determination is made that the database is within the information system 25, the process 300 moves to a state 410 wherein the type of data required by the merchant is determined. This can be calculated by, for example, maintaining a database of merchants and the desired data that they require for each consumer accessing their web site. Once a determination is made at the state 410, the process 320 moves to a state 412 wherein the required data is retrieved from the database. A determination is then made at a decision state 416 whether more data is required. For example, some merchants might require data from several databases on each consumer that attaches to their web site. If a determination is made that more data is not required, the process 320 terminates at an end state 420.

If a determination was made at the decision state 406 that the database necessary to search was not internal, the process 320 moves to a state 424 wherein the IS web server attaches to the proper external database. It should be realized that this attachment could be through dedicated or non-dedicated communication lines using standard protocols, such as TCP/IP or other well-known communication protocols.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A computerized information system for retrieving consumer data over a network based on a consumer identifier stored on a consumer device, comprising:
    a first information server configured to
        receive a transaction request over a network from an entity using a consumer device, and
        initiate retrieving a consumer identifier stored on the consumer device for transmission over the network;
    a second information server including
        a module for receiving the consumer identifier over the network from the first information server, and
        a Linkage Key conversion module comprising instructions for converting the consumer identifier into a Linkage Key;
    a Linkage Key database system comprising a consumer database indexed by the Linkage Key and configured to compare the Linkage Key to the consumer database in order to retrieve consumer data related to the entity using the consumer device from the consumer database; and
    a module for transmitting the consumer data related to the entity using the consumer device to the first information server.

2. The information system of claim 1, wherein the consumer network interface device is selected from the group consisting of: a wireless telephone, an interactive voice response system, a personal computer, a television, a personal digital assistant and a database server.

3. The information system of claim 1, wherein the Linkage Key is a spatial key that defines a geographic location.

4. The information system of claim 3, wherein the spatial key is a postal code.

5. The information system of claim 1, wherein the consumer identifier is selected from the group consisting of: a 10-digit telephone number, a United States Postal Service address, Postal Service address plus a consumer name, a 10-digit telephone number plus a consumer name, a latitude and longitude, an IP address and an e-mail address.

6. The information system of claim 1, wherein the Linkage Key is selected from a group of: a United States Postal Service Delivery Point Code (DPC), ZIP+4, State-county/census tract/census block, coordinate interleaved pair (quad-tree), 10-digit telephone number, standardized street address, standardized street address plus a standardized name, 10-digit telephone number plus standardized name, sequentially assigned number.

7. The information system of claim 1, wherein the Linkage Key conversion module comprises instructions for converting a consumer address into a United States Postal Service Delivery Point Code.

8. The information system of claim 1, wherein the first information server comprises an Internet server.

9. The information system of claim 8, wherein the Internet server comprises instructions for writing the consumer identifier to a consumer's computer.

10. The information system of claim 9, wherein the Internet server comprises instructions for writing a cookie data file to the consumer's computer.

11. The information system of claim 1, wherein the consumer data comprises one or more of household data, individual data, census data, business location data or government location data, business financial data, consumer product/service consumption scores, maps, driving directions, USPS address data, property data, environmental data and geography related data.

12. A computerized information system for retrieving consumer data over a network based on a consumer identifier stored on a consumer device, comprising:
    a first information server configured to
        receive a transaction request over a network from an entity using a consumer device,
        initiate retrieving a consumer identifier stored on the consumer device, and
        convert the consumer identifier into a Linkage Key for transmission over the network;
    a Linkage Key database comprising consumer data indexed by the Linkage Key;
    a second information server including
        a module for receiving the Linkage Key over the network from the first information server, and
        instructions for comparing the Linkage Key to the linkage database in order to retrieve consumer data related to the entity using the consumer device from the linkage database; and
    a module for transmitting the consumer data related to the entity using the consumer device to the first information server.

13. The information system of claim 12, wherein the consumer network interface device is selected from the group consisting of: a wireless telephone, an interactive voice response system, a personal computer, a television, a personal digital assistant and a database server.

14. The information system of claim 12, wherein the Linkage Key is a spatial key that defines a geographic location.

15. The information system of claim 14, wherein the spatial key is a postal code.

16. The information system of claim 12, wherein the consumer identifier is selected from the group consisting of: a 10-digit telephone number, a United States Postal Service address, Postal Service address plus a consumer name, a 10-digit telephone number plus a consumer name, a latitude and longitude, an IP address and an e-mail address.

17. The information system of claim 12, wherein the Linkage Key is selected from a group of: a United States Postal Service Delivery Point Code (DPC), ZIP+4, State-county/census tract/census block, coordinate interleaved pair (quad-tree), 10-digit telephone number, standardized street address, standardized street address plus a standardized name, 10-digit telephone number plus standardized name, sequentially assigned number.

18. The information system of claim 12, wherein the first information server further comprises instructions for converting a consumer address into a United States Postal Service Delivery Point Code.

19. A method for retrieving consumer data over a network, comprising:

receiving at a first server a network request from a consumer device to obtain information;

responsive to the request, reading a consumer identifier from the consumer device;

determining data related to the consumer to be transmitted to the first server;

converting the consumer identifier into a Linkage Key;

comparing at a second server the Linkage Key to a Linkage Key database comprising consumer data indexed by the Linkage Key in order to retrieve the consumer data related to the consumer from the Linkage Key database for transmission to the first server; end transmitting the consumer data related to the consumer to the first server.

20. The method of claim 19, wherein the information related to the user of the consumer device comprises one or more of name information, address information, household information, business information, product information, or map information.

* * * * *